United States Patent [19]

Miori

[11] 4,067,947

[45] Jan. 10, 1978

[54] METHOD OF FABRICATING A DECORATIVE KNIFE HANDLE

[75] Inventor: Nilo M. Miori, Solvay, N.Y.

[73] Assignee: Camillus Cutlery Co., Camillus, N.Y.

[21] Appl. No.: 754,347

[22] Filed: Dec. 27, 1976

[51] Int. Cl.[2] .......................... B29C 5/00; B29D 3/00

[52] U.S. Cl. .................................. 264/154; 264/162; 264/250; 264/255; 264/271; 264/274; 264/279

[58] Field of Search .............................. 63/2, DIG. 3; 30/155-161, 164; 264/129, 134, 138, 162, 245, 246, 247, 250, 255, 267, 269, 271, 274, 294, 259, 162, 279, 154

[56] References Cited

U.S. PATENT DOCUMENTS

| | | | |
|---|---|---|---|
| 137,648 | 4/1873 | Ayers | 30/164 |
| 1,816,915 | 8/1931 | Scott | 63/2 |
| 2,350,421 | 6/1944 | Schoder et al. | 428/13 |
| 2,394,400 | 2/1946 | Noles | 264/246 |
| 3,660,211 | 5/1972 | Brody | 264/271 |

*Primary Examiner*—Willard E. Hoag
*Attorney, Agent, or Firm*—Charles S. McGuire

[57] ABSTRACT

A process for fabricating a knife handle incorporating a decorative embedment upon a background of a different color than the knife handle. The handle is formed with a cavity having bottom and side walls and bounded by a lip which is raised from the outer surface of the handle. An undercut is made in the sides of the cavity, after which a plastic sealing material is applied to the bottom and sides of the cavity, in liquid form. A second layer of liquid plastic containing a dye of the desired background color is then poured into the cavity and allowed to harden, and the embedment is placed thereon. The cavity is then filled in one or more steps by a transparent plastic material. After hardening and curing of the plastic, the outer edges and surface are ground and polished to the final appearance.

10 Claims, 9 Drawing Figures

METHOD OF FABRICATING A DECORATIVE KNIFE HANDLE

BACKGROUND OF THE INVENTION

The present invention relates to methods of fabricating knife handles having decorative medallions, or the like, incorporated therein. More specifically, the invention relates to a process for making knife handles wherein an embedment, i.e., a relatively small piece initially separate from the handle, is visible through a transparent window raised from the plane of the knife handle against a background of different color than the knife handle.

It is sometimes desired to embellish a knife handle with purely decorative, i.e., non-functional, materials such as medallions and the like. Many knife handles at the present time are fabricated from plastic, and a number of techniques have been used to affix to, or otherwise incorporate in such handles ornamental materials which are initially distinct therefrom. For example, the decorative material may be mechanically attached to the handle, as by riveting, or placed within a cut-out area of the handle of approximately the same dimensions as the decorative material and affixed by heat flowng the plastic of the handle into close engagement with the other material. In addition to the limitations imposed on the nature of the decorative materials which may be incorporated in the handles by conventional techniques, there is often a substantial possibility that the decorative materials may become detached and lost. Thus, if decorative materials of any substantial value are to be incorporated in the knife handle, extreme care must be taken, usually involving expensive fabrication procedures, to minimize the possibility of detachment and loss of such materials.

Principal objects of the present invention are: to provide a method of fabricating plastic knife handles incorporating relatively expensive decorative materials in a manner which effectively precludes detachment of such materials from the handle; to provide a method of fabricating unusually attractive and durable ornamental plastic knife handles; and to provide a relatively simple and inexpensive process for fabricating ornamental knife handles which permanently incorporates therein initially separate materials.

In a more general sense, the object of the invention is to provide novel and unique methods of fabricating plastic knife handles which result in an attractive and unusual appearance.

Other objects will in part be obvious and will in part appear hereinafter.

SUMMARY OF THE INVENTION

In accordance with the foregoing objects, the invention contemplates the incorporation of a separately fabricated medallion or other such embedment in a knife handle made of plastic, or other conventional material. In the disclosed embodiment, one of the plastic side covers which is affixed to the metal liner is formed (molded) with a cavity having essentially flat bottom and side walls, and bounded by a raised lip on the outside surface of the cover. An undercut is made with an appropriate tool or otherwise formed to extend into the side wall of the cavity, adjacent the bottom wall.

A first layer of liquid plastic of suitable viscosity and hardening properties is poured into the cavity in sufficient quantity to cover the bottom wall, fill the undercut, and essentially cover the side wall. When the first layer has fully or partially cured, a second layer of liquid plastic, containing a dye which renders it opaque and of the color of the desired background, is poured into the cavity, entirely covering the first layer. After full or partial curing of the second layer the embedment is placed upon the surface thereof, within the cavity.

The cavity is then filled with transparent liquid plastic to the height of the raised lip. If there are any depressions due to shrinkage or insufficient material, additional transparent plastic may be poured to achieve a smooth surface at the desired height, preferably including a meniscus extending above the plane of the lip surroundng the cavity. Relative dimensions of the cavity, the layers of plastic, and the embedment are such that the latter is completely covered by the third layer. The edges and surface are then ground and polished to provide the desired finish.

DETAILED DESCRIPTION

Figure 1:
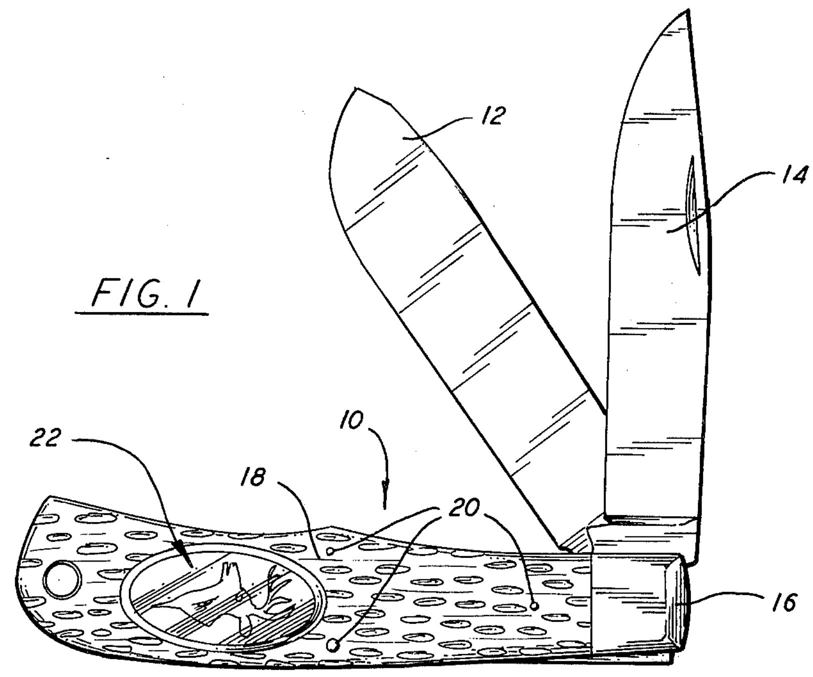
FIG. 1. is a side elevational view of a finished knife having a handle fabricated according to the process of the present invention.

Referring now to the drawings, the process of the invention is illustrated in connection with a knife, generally denoted by reference numeral 10, of the folding blade type. Knife 10 includes blades 12 and 14 attached in the usual manner for movement between unfolded and folded positions, bolster 16 and handle cover 18, attached by rivets 20 to an underlying metal liner. Handle cover 18 is molded from a suitable plastic composition, such as Delrin, which may include a coloring dye to provide a surface finish of varying shades, in accordance with conventional practice. Handle cover 18 incorporates an ornamental portion, generally designated in FIG. 1 by reference numeral 22, formed according to the process of the present invention which will now be described in detail.

Figure 2:
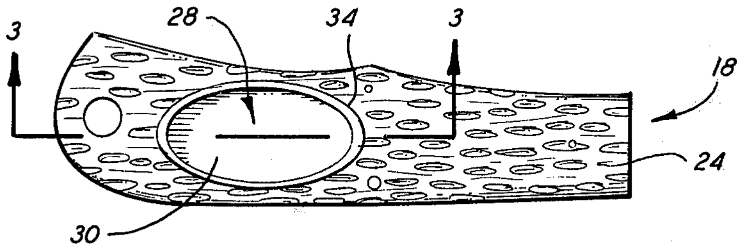
FIG. 2 is an elevational view of one of the handle covers of the knife of FIG. 1 in its initial form.
Figure 3:
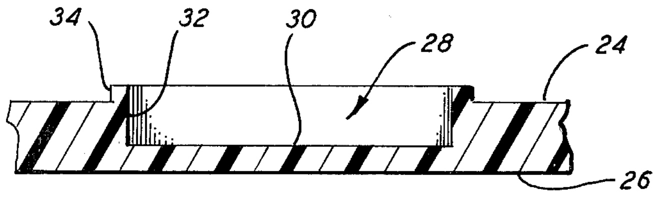
FIGS. 3–9 are a series of elevational views, in section on the line 3—3 of FIG. 2, illustrating the sequence of steps in the fabrication process.

Cover 18 is seen in FIGS. 2 and 3 in the form in which it is orginally molded. Upper surface 24 of cover 18 is visible after final assembly of knife 10, lower surface 26 being in contact with the liner to which cover 18 is affixed. Cavity 28 extends into cover 18 from the surface 24 side thereof. Bottom surface 30 of cavity 28 is substantially flat and parallel with surfaces 24 and 26 of handle 18. Side surface 32 is a contiguous, oval shaped wall in the illustrated embodiment although it may, of course, be of any desired peripheral shape. Cavity 28 is bounded at its open side by raised lip 34, which extends above the plane of upper surface 24 of handle 18.

Figure 4:
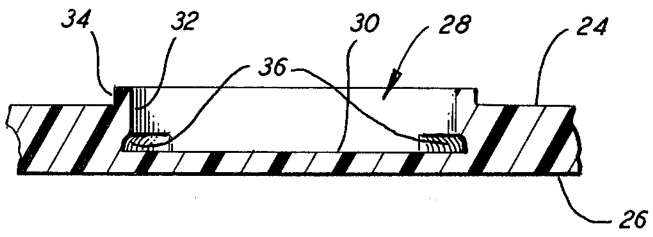

After cover 18 has been molded in the form shown in FIGS. 2 and 3, an undercut is made into side surface 32 adjacent bottom surface 30. The undercut may be continuous, around the entire periphery of the side surface, but need be only in portions thereof, such as at each end as indicated at 36 in FIG. 4. The dimensions of undercuts 36 are not critical and will depend, of course, to some extent on the dimensions of cover 18 and cavity 28. It is preferred, however, that the undercuts extend at least about 1/32 inch into surface 32 and have a height about one-quarter that of the side surface. Although it is normally more convenient and economical to form undercuts 36 with an appropriate cutting tool, after cover 18 is formed, they may be molded into the material or formed by other means.

Figure 5:
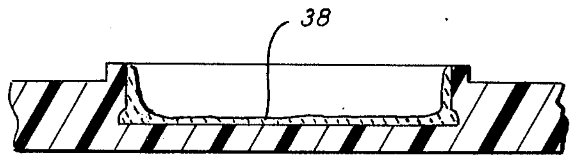

After undercuts 36 are formed, an initial layer of a plastic material initially in liquid form at room temperature and containing a hardening agent, is poured into cavity 28. The quantity of material poured is sufficient to cover fully the bottom and side surfaces of cavity 28 and to fill undercuts 36. The consistency of the material is such that it naturally tends to cling to the side surface of the cavity generally in the manner indicated in FIG. 5, the initial layer being denoted in this and subsequent Figures by reference numeral 38.

Figure 6:
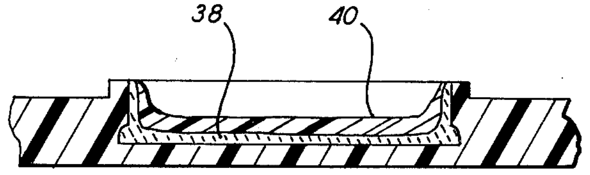

After layer 38 has fully or partially hardened, a second layer of material is poured into cavity 28. The second layer may consist of the same type material on the first, but includes a suitable dye or other coloring agent which renders it opaque, and of a desired color to form a background for the embedment to be placed within the cavity. The quantity of material poured to form the second layer is sufficient to cover fully the first layer on all initially exposed surfaces thereof. The opaque layer is denoted in FIG. 6 and subsequent figures by reference numerals 40.

Figure 7:
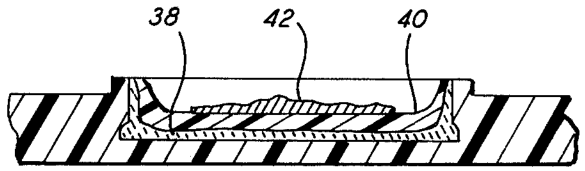
Figure 8:
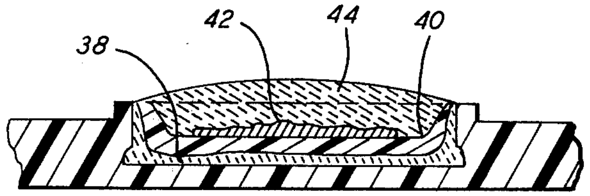
Figure 9:
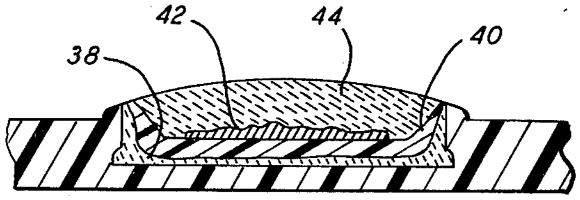

After layer 40 has fully or partially hardened, the embedment, indicated by reference numeral 42, is placed thereon as indicated in FIG. 7. A third layer of material is then poured into cavity 28. The material of the third layer is completely transparent, initially in liquid form at room temperature, but containing a hardening agent which will render it solid after a suitable curing time. The material of the third layer, denoted by reference numeral 44, is preferably an acrylic polyester having a longer curing time then the material of layers 38 and 40. The quantity of material poured to form third layer 44 is sufficient to fill the remainder of cavity 28 and to form a meniscus extending above the plane of lip 34, as indicated in FIG. 8. The material forming layer 44 may, if necessary or desirable, be poured in more than one step.

After third layer 44 has completely hardened, the edges of lip 34 are ground to form an essentially continuous, curved surface about the edges of ornamental portion 22. Embedment 42 is clearly visible through layer 44, against the background formed by layer 40. Initial layer 38 effectivly seals the interior of cavity 28, preventing contact of the materials of handle cover 18 with background layer 40 so that any dye or coloring agent from the cover cannot bleed into that of the background layer. The different section shading used for layers 38, 40 and 44 is intended to indicate the opacity of layer 40 and transparency of layers 38 and 44.

From the foregoing, it may be seen that the invention provides an ornamental knife handle wherein a decorative embedment is securely incorporated. The embedment, although fully visible, is essentially permanently incorporated into the handle cover by virtue of the unique process of the invention.

What is claimed is:

1. A method of fabricating a decorative knife handle comprising the steps of:

a. forming a handle member of plastic containing a coloring agent with a cavity extending into an exterior surface thereof, said cavity having bottom and side surfaces and an open top;

b. forming at least one undercut into said side surface adjacent said bottom surface;

c. pouring into said cavity a first quantity of plastic material, initially in liquid form and hardenable to solid form, covering said bottom and side surfaces and filling said undercuts, leaving a substantial portion of said cavity open;

d. allowing said first quantity of material to at least partially harden, thereby forming a first layer within said cavity;

e. pouring into said cavity a second quantity of opaque plastic material, of a color different from that of said handle member, initially in liquid form and hardenable to solid form, covering fully said first layer while leaving a substantial portion of said cavity open;

f. allowng said second quantity of material to at least partially harden, thereby forming a second layer within said cavity concealing said first layer and entirely isolated thereby from contact with the material of said handle member, preventing any bleed through of said coloring agent from said handle member into said second layer;

g. placing a preformed, decorative embedment upon said second layer;

h. pouring into said cavity a third quantity of transparent plastic material, initially in liquid form and hardenable to solid form, sufficient to cover said second layer and said embedment, substantially filling said cavity; and 1. allowing said third quantity of material to harden, thereby forming a third layer through which said embedment said second layer are visible.

2. The invention according to claim 1 and further including forming a lip, raised from said exterior surface, around the periphery of said cavity.

3. The invention according to claim 2 wherein the lateral dimensions of said cavity are substantially greater than its depth.

4. The invention according to claim 3 wherein said undercut extends from said bottom surface along said side surface for a distance not greater than approximately one-quarter of the depth of the said cavity.

5. The invention according to claim 4 wherein said undercut is formed after said handle member is formed by cutting into said side surface.

6. The invention according to claim 1 wherein said handle member is formed by molding a plastic material to the desired shape and size.

7. The invention according to claim 6 wherein said handle member comprises a cover having exterior and interior surfaces which are exposed and concealed, respectively, when said cover is assembled with the knife, said interior surface being substantially planar and parallel with said bottom surface of said cavity.

8. The invention according to claim 7 wherein said first, second and third materials are all acrylic plastics.

9. The invention according to claim 8 and further including forming a lip, raised from said exterior surface, around the periphery of said cavity and filling said cavity with said third material to form a meniscus raised from the plane of said lip.

10. The invention according to claim 9 and including the further step of polishing the surface of said third layer.

* * * * *